June 18, 1968 P. W. MARSHALL ET AL 3,388,675
PASTRY FORMING MACHINE
Filed Oct. 20, 1965 3 Sheets-Sheet 1
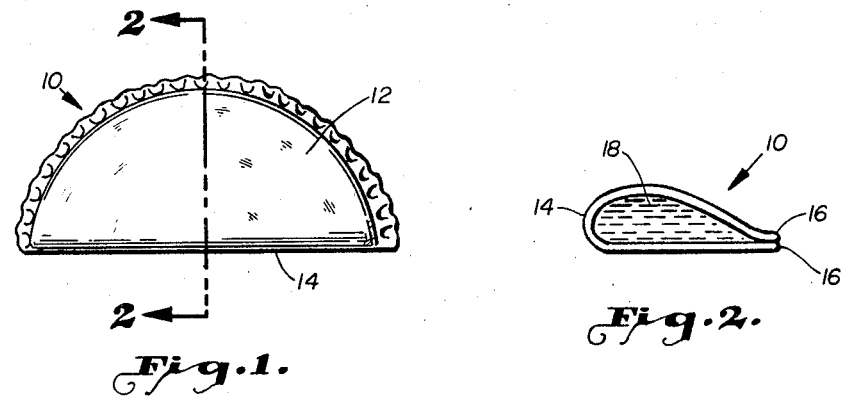
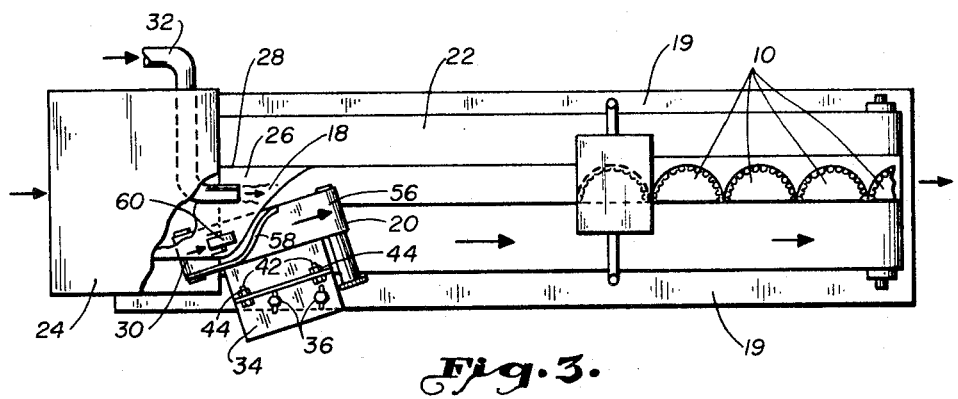
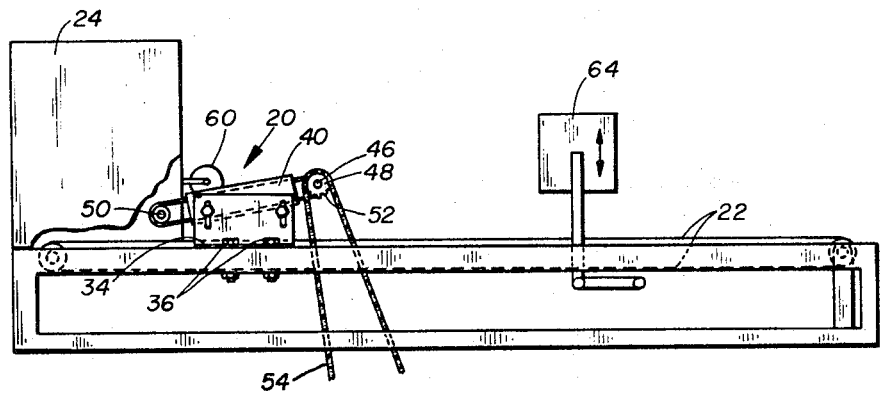
INVENTORS.
PAUL W. MARSHALL
FLOYD L. LANKFORD
BY
*Head & Johnson*
ATTORNEYS June 18, 1968    P. W. MARSHALL ET AL    3,388,675
PASTRY FORMING MACHINE
Filed Oct. 20, 1965    3 Sheets-Sheet 2

INVENTORS.
PAUL W. MARSHALL
FLOYD L. LANKFORD
BY
*Head & Johnson*
ATTORNEYS

INVENTORS.
PAUL W. MARSHALL
FLOYD L. LANKFORD

ATTORNEYS

United States Patent Office 3,388,675
Patented June 18, 1968

3,388,675
PASTRY FORMING MACHINE
Paul W. Marshall, 3507 E. 21st St. 74114, and Floyd L. Lankford, 2743 E. 53rd St. 74105, both of Tulsa, Okla.
Filed Oct. 20, 1965, Ser. No. 498,777
9 Claims. (Cl. 107—1)

ABSTRACT OF THE DISCLOSURE

Pastry products such as fried pies are formed from a continuous dough sheet which is folded upon itself by a secondary canted conveyor contiguous to a primary conveyor. A cutting and crimping mechanism oscillates in timed motion with the primary conveyor to form the individual products.

---

This invention relates to pastry forming machinery. More particularly, this invention relates to pastry forming machinery, which continuously produces folded pastry products. Still more particularly, this invention relates to pastry forming machinery for automatically and continuously producing filled and folded pastry products as, for example, fried pies. Yet still more particularly, this invention relates to pastry forming machinery for automatically and continuously preparing filled and folded pastry products in which the folding of the pastry product is accomplished automatically and continuously.

In the preparation of various pastry products such as fried pies considerable difficulty is encountered in properly combining the operation of filling the pastry, folding the pastry upon itself and cutting the pastry to its desired dimensions. Generally, in the preparation of fried pies or filled coffee cakes, a continuous dough sheet is presented to the forming machinery. The filling, folding, and cutting operation are performed in a wide variety of ways. One manner of preparing a filled and folded product is to have the forming machine cut small sections of dough from the continuous dough sheet and present these sections of specified dimensions to a highly complicated filling and folding device where each individual portion of dough is filled and folded. A plurality of individual folding devices and a complex arrangement of machinery is required to operate these devices. But still the most basic method of forming fried pies or the like is to provide manual folding of the dough sheet upon itself after the desired filling has been placed upon the flat dough sheet. Very little success has been achieved so far in escaping manual folding operations unless the folding mechanism has been made extremely complex and unwieldly. The manual folding operation is costly, inefficient, and unsanitary with the added disadvantage that a repetitive operation tends to lull the worker into inattentiveness with the resultant danger of his being injured by the machinery.

The primary object of this invention is to provide a pastry forming machine in which the operations of conveying a dough sheet, presenting edible filling to the dough sheet, folding the dough sheet to enclose the edible filling, and cutting the filled and folded pastry are carried out automatically with a minimum of human supervision, in an efficient manner with simple machinery.

A further object of this invention is to provide a dough folding device which mechanizes the operation of folding a dough sheet upon itself.

Further objects and advantages of the invention will become apparent from the following description and claims, and from the accompanying drawings, wherein:

FIGURE 1 is a top elevational view of a pastry product prepared by the operation of this invention.

FIGURE 2 is a cross-sectional view of the pastry product of FIGURE 1 taken along the lines 2—2.

FIGURE 3 is a top elevational view of a pastry forming machine showing the dough folding device in position.

FIGURE 4 is a side elevational view of a pastry forming machine showing the dough folder of this invention in position relative to the entire machine.

Figure 5:
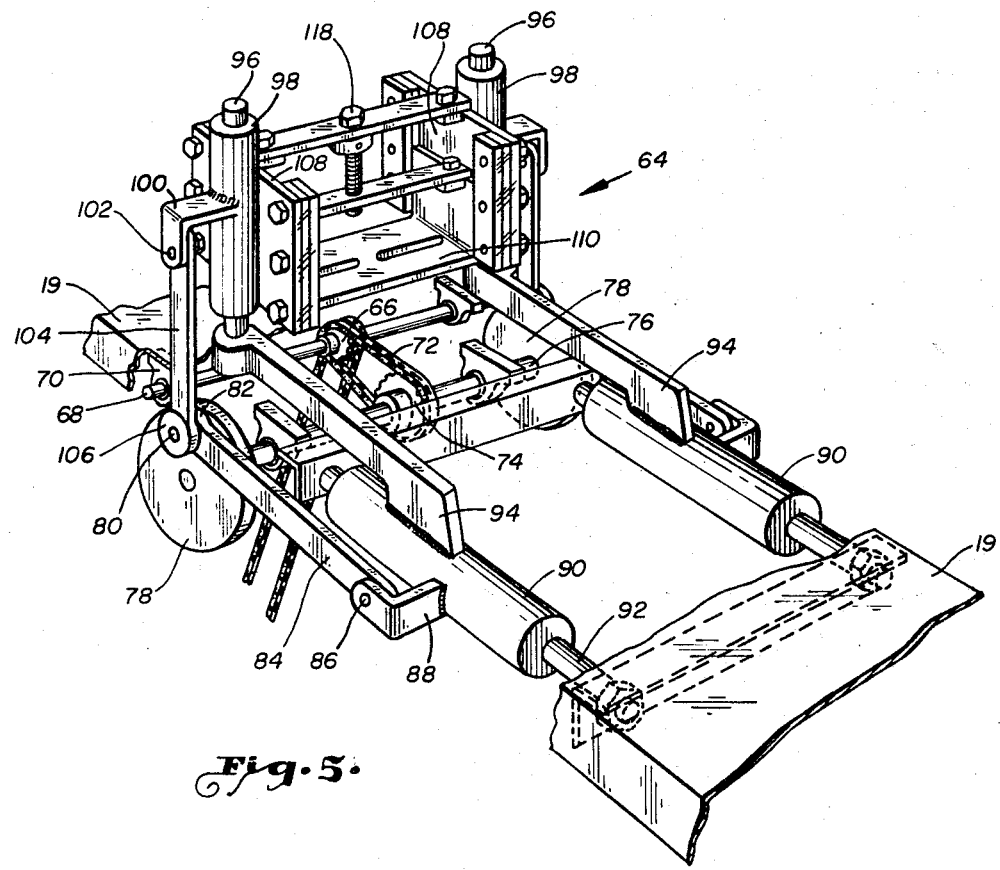
FIGURE 5 is an isometric view in enlarged detail of a pie cutting mechanism of this invention.

The dough folding device of this invention is incorporated into a pastry forming machine to provide automatic mechanized operation of the dough folding operation. Essentially, the dough folder comprises a small endless conveyor belt and arm extending over the small conveyor belt to guide a portion of a dough sheet into a folded position.

Referring now to the drawings in detail, FIGURES 1 and 2 describe a pastry product prepared by the operation of this invention, in particular, a fried pie designated generally by the numeral 10 which consists of a portion of a sheet of dough 12 folded back upon itself at the edge 14, then cut into a semi-circular shape with the semi-circular edges 16 crimped together. Before being folded and cut, the dough sheet 12 is presented with a filling of edible material, such as fruit, jelly, or preserves, represented generally by the numeral 18. FIGURES 3 and 4 describe a frame 19 supporting the pastry forming device of this invention including a dough folder represented generally by the numeral 20 in its approximate relationship with the complete pastry forming machine which is represented partly in schematic form. The dough folder 20 is placed in position slightly above and near one end of a continuous conveyor belt 22 upon which the full width of dough sheet 12 is presented as it emerges from a dough mixing and rolling apparatus represented schematically by the numeral 24. The dough mixer 24 is a conventional means of mixing and preparing pastry dough, such as pie crust, and presenting this dough in a continuous, broad, flat sheet to conveyor belt 22. The mechanism which drives the dough mixer 24 and conveyor belt 22 is conventional and is not represented in the drawings. The flat dough sheet 26 emerges from the dough mixer 24 and begins its travel along the conveyor belt 22. The flat dough sheet 26 substantially covers the width of conveyor belt 22 with its edges 28 and 30 approximately parallel to the edges of the conveyor belt. At a point a short distance beyond where the flat dough sheet 26 engages conveyor belt 22, filling mechanism 32 automatically deposits the edible material intended as a filling for the finished pastry product. Filling mechanism 32 is also a conventional filling device, and it may deposit the edible filling material 18 as either a continuous stream of filling material or as discrete portions of filling material. At a point close to where flat dough sheet 26 engages conveyor belt 22 is positioned dough folder 20 in a position above conveyor belt 22 and in close proximity thereto. Dough folder 20 includes an angular mounting member 34 removably mounted on frame 19 by means of bolts 36 secured by nuts 38, a second angular mounting plate 40 held removably and adjustably to mounting member 34 by bolts 42 and nuts 44 which mounting plate 40 supports journal 46. Journals 46 provide a means to hold in rotatable position rollers 48 and 50. On the outer end of roller 48 is a conventional sprocket 52 around which a chain 54 is placed and which chain acts as a driving means for the dough roller. Of course, the sprocket 52 and chain 54 could be replaced by other conventional driving means, such as, a sheave and belt arrangement. Around the rollers 48 and 50 is placed conveyor belt 56 which is considerably smaller than main conveyor belt 22. The driving mechanism for conveyor belt 56, sprocket 52, and chain 54 can be either inter-regulated with the driving mechanism of main conveyor belt 22, or may be integral with the driving system of conveyor belt 22 so that conveyor belt 56 may move at the same speed, that is, surface speed, as main conveyor belt 22. Also, conveyor belt 56 moves in the substantially same direction as conveyor belt 22 with the provision that the entire dough folder mechanism may be adjusted at a slight angle to conveyor belt 22 as shown in FIGURE 3. Attached to frame member 40 is folder arm 58 which extends arcuately substantially across conveyor belt 56. Folder arm 58 is shaped somewhat like an elongated S and is attached to frame member 40 adjacent one end of the approximately S-shaped member. Folder arm 58 is essentially a curved bar, rectangular in shape with the rectangular sides of the arm member substantially perpendicular to the surface of conveyor belt 56 and with the bottom edge of folder arm member 58 just slightly above the upper surface of conveyor belt 56. Attached to frame 19 is a guide roller 60 held in place against dough folder 20 by reason of its being attached to frame 19 through a hinge 62. Guide roller 60 is springably biased against conveyor belt 56 and is designed to be adjustable longitudinally with respect to conveyor belt 56.

As dough sheet 26 emerges from the dough mixer 24 and engages conveyor belt 22, a portion of dough sheet 26, approximately half the width of the sheet, will engage and be carried upon the conveyor belt 56. Thus, as the edible filling 18 is being presented upon the surface of dough sheet 26 the portion of dough sheet 26 traveling upon conveyor 56 is urged upwardly and toward edge 28 of dough sheet 26 by means of the cooperation of conveyor belt 56 and folder arm 58, with dough sheet 26 eventually to be folded upon itself. Usually, the consistency and other characteristics of the dough sheet are such that the portion of the dough sheet traveling upon conveyor belt 56 will be folded over upon the portion traveling upon belt 22 before the dough sheet reaches folder arm 58. However, folder arm 58 insures that this folding will take place, particularly when the dough consistency has become such that it does not readily fold over. Adjustments are provided within the dough folder, so that edge 30 of dough sheet 26 can be made to coincide with edge 28 of dough sheet 26 when the sheet is folded upon itself thus forming a closed, somewhat tubular, structure. Then after being folded through a closed conformation and traveling for a short distance along conveyor belt 22, the closed dough sheet with filler inside encounters a cutting device generally indicated by the numeral 64 arranged above conveyor belt 22, secured to frame 19 in a conventional manner, and provided with appropriate drive means.

Figure 7:
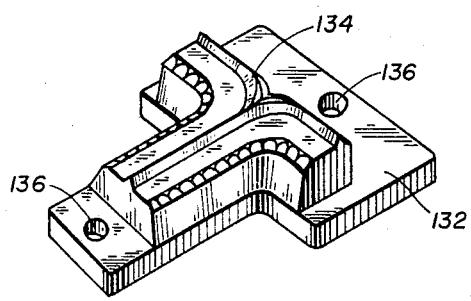
FIGURE 7 is an isometric view of a pie cutting and edge crimping knife of this invention.
Figure 6:
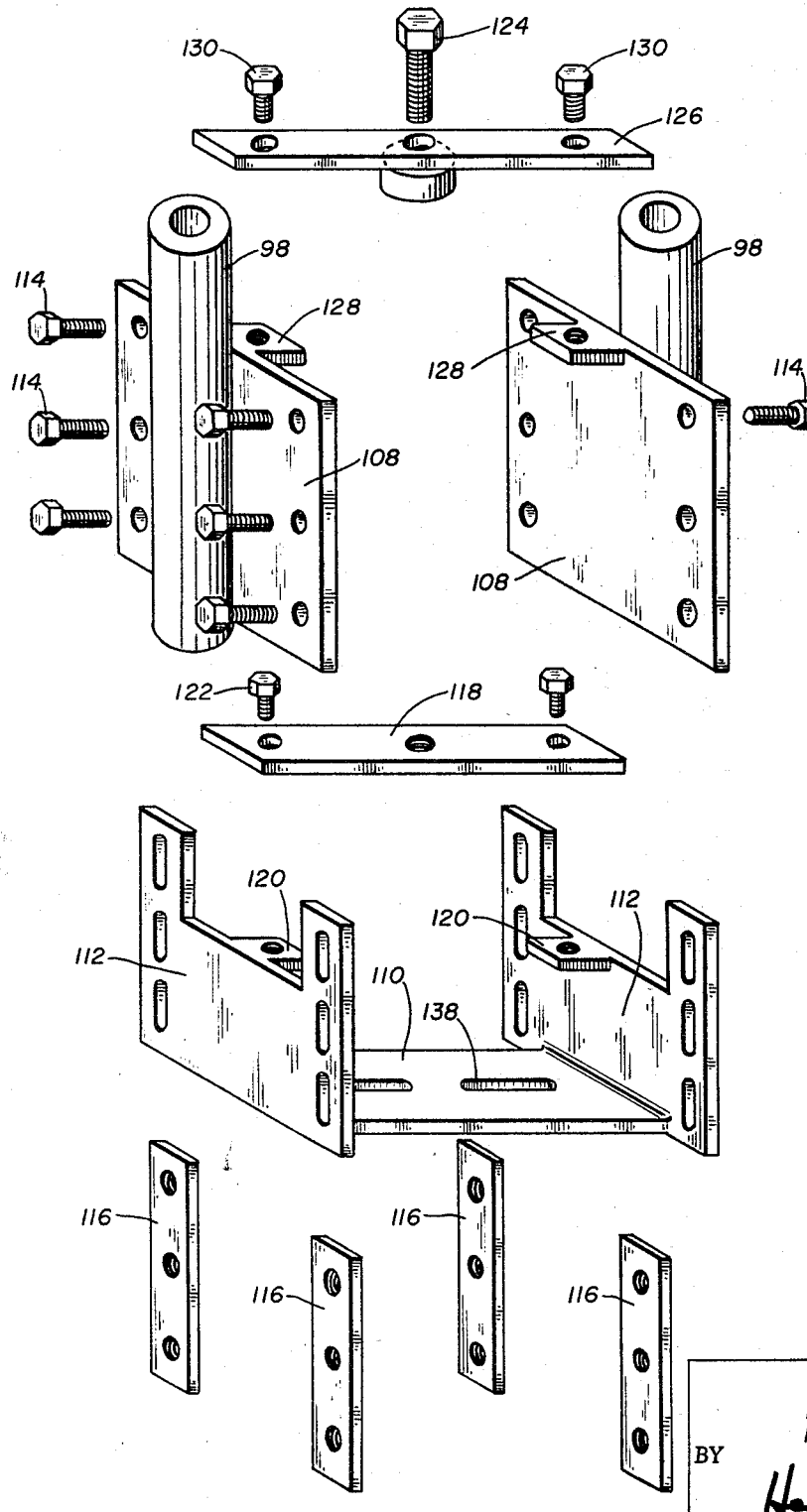
FIGURE 6 is an exploded view of the pie cutting mechanism of FIGURE 5.

FIGURE 5 describes the cutting and edge crimping device of this invention, generally referred to by the numeral 64, and shows in detail the operating components of this device. The cutting device is designed to impart a reciprocating motion to a cutting knife. That is, in operation the cutting device will impart a cutting knife reciprocating vertical motion and reciprocating horizontal motion at the same time. A double drive sprocket 66 is secured to a shaft 68 which shaft 68 rests in a pair of bearings 70, which bearings are in turn secured to the frame 19. One sprocket of the double drive sprocket 66 receives driving motion through a chain driven by conventional driving means positioned elsewhere in the pastry machine. The other sprocket of double drive sprocket 66 engages drive chain 72 which is the means by which the driving motion is imparted to the cutting device. Drive chain 72 transfers its motion from sprocket 66 to another drive sprocket 74 positioned upon shaft 76. Shaft 76 is secured at either end to a cam 78 to impart rotative motion to cam 78. Positioned off center of cam 78 is another small shaft 80. An inner bearing 82 is placed on shaft 80 in a bearing relationship, and a horizontal drive rod 84 is secured to the inner bearing 80. The other end of horizontal drive rod 84 is swivelably attached by means of pin 86 to one end of bracket 88. The other end of bracket 88 is secured to a cylinder 90 through which a cylinder rod 92 slides. Each end of cylinder rod 92 is secured to a portion of frame 19. Atop cylinder 90 is secured one end of a bracket member 94. Into the other end of bracket member 94 is secured one end of a cylinder rod 96, which is positioned substantially vertically in order to act as a guide for cylinder 98 which fits slidably over rod 96. Extending from a side of cylinder 98 is a bracket 100 into which a pin 102 is positioned. A vertical drive rod 104 is swivelably attached adjacent one end to pin 102. The other end of vertical drive rod 104 is secured to an outer bearing 106 which is positioned on shaft 80 in such a manner that shaft 80 is free to rotate within bearing 106. Secured to each vertical cylinder 98 is a holding plate 108 which supports a slotted lower bar member 110 which is secured to each plate 108. As better shown in FIGURE 6 slotted lower plate 110 has slotted slide extensions 112 by means of which it is removably and adjustably held in place against plate 108 by means of bolts 114 securing plate 112 between plate 108 and a holding plate 116. Plate 110 is further secured in position by means of plate 118 which is removably secured against flange 120 by means of screw 122 and the positioning of plate 118 by adjustment of screw 124 through plate 126 which in turn is held removably secured to tongues 128 by means of screws 130. Cutter 132 is shown in FIGURE 7 as being removed from the cutting device in order to show the configuration of the actual cutting knife 134. In its normal position cutter 132 is held flat against the bottom of plate 110 by cooperation of conventional nuts and bolts passing through openings 136 in cutter 132 and 138 in plate 110.

During the operation of the cutting device of this invention, the drive mechanism causes cam 78 to rotate and because of this rotation bearings 82 and 106 are given an eccentric motion. The eccentric motion of inner-bearing 82 acting through the drive rod 84, pin 82, and bracket 88 causes cylinder 90 to slide back and forth in a horizontal motion along rod 92. Cylinder 90 moves horizontally and rod 84 moves in an oscillatory motion. At the same time outer bearing 106 also moves in an eccentric manner, and causes drive rod 104 to move responsively to this motion and in turn cause cylinder 98 to move vertically slidably along rod 96. Thus, the movement of the cutting device is a combination of two motions, an oscillatory horizontal motion and an oscillatory vertical motion. The combination of these two motions causes the plate 110 to which the cutter 132 is attached to move in a circular manner, when looking at the cutting device from the side. The preferred adjustment of plate 110 and consequently cutter 132 is that cutting knives 134 will touch the conveyor belt of the pastry forming machine tangentially, which motion helps keep the cutting device from tearing or distorting the dough material.

At FIGURE 7 it is seen that the cutting and edge crimping knife 134 is designed to have its cutting edge made in a branched or split conformation. That is, cutting knife 134 has three cutting edges which join at a common edge. This design is unique in that in operation the cutting knife will cut out and crimp one half sections of two different pastry units rather than cutting out one complete pastry unit with each stroke. With each stroke a second portion of one pastry unit and a first one-half portion of the following pastry unit will be cut out and edge crimped. This is important in that this procedure prevents sticking of the pastry units to the cutting knife or jamming of the cutting knife particularly during humid weather.

Since many different embodiments of this invention may be made without departing from the spirit and scope thereof, it is to be understood that the specific embodiments described in detail herein are not to be taken in a limiting sense, since the scope of the invention is best defined by the appended claims.

What is claimed:

1. In a pastry forming machine comprising a frame, a first means for conveying a flat dough sheet, means for preparing said dough sheet and presenting flat dough sheet to said first conveying means, and means for presenting edible filling material to said flat dough sheet, the improvement comprising:

a dough folder positioned above said first conveying means, said dough folder including a second conveyor means smaller than said first conveyor means, mounted above said first conveying means and positioned to convey said dough sheet in cooperation with said first conveyor means, and cutting means positioned above said first conveying means, said cutting means including a cutting head mounted upon means for imparting reciprocating motion to said cutting head in relation to said first conveying means, said dough sheet being conveyed in an initially flat condition by said first and said second conveyor means cooperatively, and after receiving said filling material, said second conveyor means causes that portion of said dough sheet being carried by said second conveyor means to be folded over said filling material and over that portion of said dough sheet being carried by said first conveyor means, and after being folded over upon itself, said dough sheet passes under said cutting means so that said cutting means cuts and forms individual pastry units.

2. In a pastry forming machine comprising a frame, a first means for conveying a flat dough sheet, means for preparing said flat dough sheet and presenting said flat dough sheet to said first conveying means, means for presenting edible filling material to said flat dough sheet, and means for cutting said dough sheet, the improvement comprising a dough folder positioned between said means for presenting said dough sheet to said conveying means and said cutting means, said dough folder including a second conveyor means smaller than said first conveyor means, mounted on said frame above said first conveying means and positioned to convey said dough sheet in cooperation with said first conveyor means, and a rigid folder arm mounted on said frame and extending arcuately substantially across said conveyor means and close to the top surface thereof, said dough sheet being conveyed in an initially flat condition by said first and said second conveyor means cooperatively, and after receiving said filling material, said dough sheet encounters said folder arm and said folder arm directs that portion of said dough sheet being carried by said second conveyor means to be folded over said filling material and over that portion of said dough sheet being carried by said first conveyor means.

3. A pastry forming machine as described in claim 1 in which said first and said second conveyor means are each endless conveyor belts and are each traveling in substantially the same direction and at substantially the same speed.

4. A pastry forming machine as described in claim 3 in which said second conveyor means is inclined slightly forwardly with respect to said first conveyor means and is at a slight angle longitudinally with respect to said first conveyor means.

5. A pastry forming machine as described in claim 3 in which said dough folder includes guide means yieldably biased against the upper surface of said second conveyor means to guide said dough sheet interposed between said second conveyor means and said guide means.

6. A pastry forming machine as described in claim 2 in which said dough folder is adjustable vertically, longitudinally, and transversely in relation to said first conveyor means.

7. A pastry forming machine comprising a frame, a first endless conveyor belt for conveying a flat dough sheet, means for preparing said flat dough sheet and presenting said flat dough sheet to said first endless conveyor belt, means for presenting edible filling material to said flat dough sheet, and means for cutting said dough sheet, the improvement comprising a dough folder positioned between said means for presenting said dough sheet to said first endless conveyor belt and said cutting means, said dough folder including a second endless conveyor belt traveling in substantially the same direction and at substantially the same speed as said first conveyor belt, said second conveyor belt mounted on said frame above said first conveyor belt and positioned to convey said dough sheet in cooperation with said first conveyor belt, said second conveyor belt being inclined slightly forwardly with respect to said first conveyor belt and at a slight angle longitudinally with respect to said first conveyor belt, and a rigid folder arm mounted on said frame and extending arcuately substantially across said second conveyor belt and close to the top surface thereof, said dough folder being adjustable vertically, longitudinally, and transversely in relation to said first conveyor belt, said dough sheet and a pastry cutter including a cutting knife, said pastry cutter mounted above said first conveyor belt and operating reciprocatingly with respect to said first conveyor belt, said dough sheets being conveyed in an initially flat condition by said first and said second conveyor belts cooperatively, and after receiving said filling material, said dough sheet encounters said folder arm and said folder arm directs that portion of said dough sheet being carried by said second conveyor belt to be folded over said filling material and over that portion of said dough sheet being carried by said first conveyor means, and said filled and folded dough sheet passing under said cutter, said cutter reciprocatingly cutting and forming individual pastry units.

8. A pastry forming machine as described in claim 2 wherein said cutting means includes a cutting and edge crimping knife positioned above said conveying means and timed to the continuous movement of said first conveying means to move in a combination oscillatory horizontal movement and oscillatory vertical movement whereby said cutting means will follow the movement of said first conveying means during the cutting and edge crimping of the desired pastry form and hence prevent tearing of said form.

9. The pastry forming machine as described in claim 8 in which said cutting means is formed to cut out and crimp one half of each adjacent pastry unit and wherein said combination motion will cyclically cut and edge crimp the upstream half of a downstream pastry unit and the downstream half of the next adjacent upstream pastry unit.

References Cited

UNITED STATES PATENTS

| 2,345,637 | 4/1944 | Stiles | 107—1 |
| 2,434,339 | 1/1948 | Stiles | 107—69 X |
| 2,591,256 | 4/1952 | Hart | 83—318 |
| 3,095,832 | 7/1963 | Evans | 107—1 |
| 3,112,713 | 12/1963 | Jahn | 107—1 |
| 3,129,674 | 4/1964 | Jahn | 107—12 |
| 3,276,397 | 10/1966 | Poppee et al. | 107—1 X |

WILLIAM I. PRICE, *Primary Examiner.*

WALTER A. SCHEEL, *Examiner.*

A. HENDERSON, *Assistant Examiner.*